United States Patent [19]
Kopp et al.

[11] Patent Number: 5,420,912
[45] Date of Patent: May 30, 1995

[54] TELEPHONE HAVING PORTABLE VOICE CONTROL MODULE FOR PLAYING BACK SPEECH OR PERFORMING A HANDS-FREE TELEPHONE FUNCTION

[75] Inventors: Dieter Kopp, Hemmingen; Susanne Dvorak, Asperg; Thomas Hörmann, Grossbottwar, all of Germany

[73] Assignee: Alcatel N.V., Amsterdam, Netherlands

[21] Appl. No.: 195,688

[22] Filed: Feb. 16, 1994

[30] Foreign Application Priority Data

Feb. 27, 1993 [DE] Germany .................. 43 06 199.0
Feb. 27, 1993 [DE] Germany .................. 43 06 200.8

[51] Int. Cl.⁶ .......................................... H04M 11/00
[52] U.S. Cl. ........................................ 379/63; 381/42
[58] Field of Search .............. 370/110.1; 379/63, 88, 379/58; 381/41, 42, 43

[56] References Cited

U.S. PATENT DOCUMENTS

| | | | |
|---|---|---|---|
| 4,677,657 | 6/1987 | Nagata et al. ................. | 379/63 |
| 4,799,144 | 1/1989 | Parruck et al. . | |
| 4,827,518 | 5/1989 | Feustel et al. . | |
| 4,851,654 | 7/1989 | Nitta . | |

FOREIGN PATENT DOCUMENTS

| | | |
|---|---|---|
| 0102109 | 3/1984 | European Pat. Off. . |
| 0138062 | 4/1985 | European Pat. Off. . |
| 0276403 | 8/1988 | European Pat. Off. . |
| 0277276 | 8/1988 | European Pat. Off. . |
| 0397399 | 11/1990 | European Pat. Off. . |
| 0495252 | 7/1992 | European Pat. Off. . |
| 0536792 | 4/1993 | European Pat. Off. . |
| 2573886 | 5/1986 | France . |
| 3438333 | 5/1985 | Germany . |
| 3428237 | 2/1986 | Germany . |
| 3608497 | 9/1987 | Germany . |
| 9006238 | 10/1990 | Germany . |
| 4228692 | 1/1993 | Germany . |
| 4227826 | 2/1993 | Germany . |
| 4141382 | 6/1993 | Germany . |
| 4287547 | 10/1992 | Japan ..................... 381/42 |
| 2167920 | 6/1986 | United Kingdom . |
| 2196463 | 4/1988 | United Kingdom . |
| 2225459 | 5/1990 | United Kingdom . |
| 9220048 | 11/1992 | WIPO . |

OTHER PUBLICATIONS

Telecommunications–Asia, Americas, Pacific: PTC '86 Proceedings, 1986, Honolulu–Seiten 166–175, G. J. Lissandrello 'Chip cards (memocards) and telecommunications'.

Immendorfer, Manfred: u.a.,: Sprachgesteuertes Telefon mit elektronischem Telefonregisterspeicher. In: ntz, BD. 37, 1984, H.8, S.496–499.

"Chip Cards (Memocards) and Telecommunications"; George J. Lissandrello; Pacific Telecommunications Council; Honolulu, USA 1986, pp. 166–175.

Chip Cards; cards with "memory", Eberhard Schrother, Funkschau (Radio Show) Jul. 1988, pp. 50–52.

Feldmann, Joachim: Allround–Chip Sprach–funktion. In: Funkschau Mar. 1992, S.68–73.

Ruhl, H.–W. u.a.: SPS51 A universal interface for hands–free telephony speech recognition and speech storage in the car telephone. In: Philips Telecommunication Review, vol. 48, No. 4, Dec. 1990, S.1–9.

(List continued on next page.)

Primary Examiner—Curtis Kuntz
Assistant Examiner—William Cumming
Attorney, Agent, or Firm—Ware, Fressola, Van der Sluys & Adolphson

[57] ABSTRACT

The operation and control of devices is made possible by a portable unit. Operation and control of devices, particularly telephone installations is a means of speech via a portable voice module. A portable voice module contains a digital signal processor (DSP), a memory (S), an analog-digital/digital-analog converter (AD/DA), an analog interface (ANALOG I/O), a computer interface (PORT) and a digital interface (DIGITAL I/O). A telephone installation consists of the portable voice module and a telephone device, which is composed of basic units and interfaces.

20 Claims, 3 Drawing Sheets

U.S. PATENT DOCUMENTS

Matsuo, Naoki; et al. L Personal Telephone Services Using IC-Cards. In: IEEE Communications Magazine, Jul. 1989, S.41–48.

Hammerschmitt, Jurgen; Krings, Gert: Von der Telefonkarte zur Cryptokarte. In: telcom report 14, 1991. H.3, S.158–161.

Peacocke, Richard D.: Graf, Daryl H.: An Introduction to Speech and Speaker Recognition, In: Computer, Aug. 1990, S.26–33.

Lauer, Lothar: Acht sehen mehr. In: elektrotechnik, H.6, 14. Jun. 1, 1993, 75.JG., S.35–37.

TELEPHONE HAVING PORTABLE VOICE CONTROL MODULE FOR PLAYING BACK SPEECH OR PERFORMING A HANDS-FREE TELEPHONE FUNCTION

TECHNICAL FIELD

The invention concerns a portable voice module and its potential utilization.

BACKGROUND OF THE INVENTION

The operation of devices, telecommunications terminals in this instance, by means of a portable unit is known from the field of telecommunications. Chip cards, which are also known by the name of smart-card or memocards, are used for this purpose.

Other known configurations of cards for operating a telecommunications terminal are magnetic strip cards, hologram cards and laser cards. Furthermore, memory cards are known in the state of the art, which only consist of memory units with non-volatile memory, but do not have any built-in intelligence. ("Chip Cards (Memocards) and Telecommunications"; George J. Lissandrello; Pacific Telecommunications Council; Honolulu, USA, 1986; pages 166 to 175).

In contrast to these three types of cards, the chip card (smart-card) has a built-in "intelligence", which can perform calculations and control the access to the memory in the card. These chip cards are used as "electronic money", "electronic keys" or as "portable information storage". Frequently used telephone numbers can thus be stored in the chip card and called up for public telephones with the "Quick dialing" service feature. ("Chip cards; cards with "memory""; Eberhard Schröther; Funkschau (Radio Show) 7/1988; pages 50–52).

Chip cards are also used for "protected data storage", as "in-the-card data encoding" (end-to-end encryption), as "reciprocal authentication of cards and terminal", as an "electronic signature" and as "proof of identity in the card" ("The chip card in modern communications systems"; Wolfgang Effing, ITF technical report; Volume 101; pages 451 to 464).

Another area of utilization of portable units for operating devices is found in the field of dam processing and dam communication. With printers, e.g. laser printers, so-called IC cards are used to expand the active character set (Kyocera Laser Printer, F 2200, Japan). When selecting a character set that is not located in the read-only memory of the printer but in the IC card, the additional memory, the character set of the IC card is activated for printing.

The invention has the task of developing the operation and control of devices by means of a portable unit. In particular, the task consists in developing the voice-controlled operation of a telephone installation.

SUMMARY OF THE INVENTION

According to the invention, this task is fulfilled by a portable voice module for the voice-controlled operation and control of devices, consisting of: a memory (S), a digital signal processor (DSP), an analog-digital/digital-analog converter (AD/DA), an analog interface (ANALOG I/O), a digital interface (DIGITAL I/O), and a computer interface (PORT), in which the digital signal processor (DSP) is connected to the memory (S), the computer interface (PORT), the digital interface (DIGITAL I/O), and through the analog-digital/digital-analog converter (AD/DA) to the analog interface (ANALOG I/O). It is further fulfilled by a telephone installation consisting of a portable voice module for voice-controlled operation of the telephone installation, with a digital signal processor (DSP), with an analog-digital/digital-analog converter (AD/DA), with an analog interface (ANALOG I/O), with a digital interface (DIGITAL I/O) and with a memory (S) for storing the software programs of service features and software programs for voice encoding and voice recognition, where the digital signal processor (DSP) is connected to the memory (S), as well as to the digital interface (DIGITAL I/O), and through the analog-digital/digital-analog converter (AD/DA) to the analog interface (ANALOG I/O), and a telephone device with a plug-in interface for the portable voice module.

An advantage of the invention is that the spoken language is directly recorded, where e.g. important information is stored in the memory and can later be recalled at any time. It is no longer necessary to enter data by means of a keyboard. Therefore language, or data in the form of language, can be recorded without use of the hands. Furthermore, measurement data and language can very easily be recorded by the portable voice module. Recording in the portable module can take place in parallel to the determination and measuring of measurement data.

Another advantage of the portable voice module is that the operation or control commands for devices can always be given in the individually selected language, e.g. the mother tongue. For example, if the portable voice module user finds himself in a foreign country, he can enter a command in his mother tongue, and the command will be correctly executed, regardless of the language spoken there. In this way, a firmly defined set of control and operation commands is always available.

When used for a telephone installation, an advantage of the invention is that the use of the portable voice module, which contains software programs for executing service features, allows the service features to be user-specifically programmed, and can then be used regardless of the location where the user is at the time, thus they are available everywhere and at all times.

Furthermore, the telephone devices of this telephone installation need only to consist of their basic components. Under basic telephone components, in this instance, are understood the components that must absolutely be available to make telephoning possible, without any additional components. The assembly of basic components, in turn, has the advantage that the devices are low-priced, but can still make available all the service features, if they are supplied and activated by being plugged into the portable voice module. Nor is the type of selected telephone device limited, since any telephone can be used, if it has an interface for plugging into the portable voice module.

The portable voice module may be in the form of a bank card.

The portable voice module can also be configured to record and play back language. The language can therefore be recorded in one location, and be played back elsewhere for evaluation.

In addition, this portable voice module can record and play back graphic data. To that effect, graphic data are input into the portable voice module through the digital interface DIGITAL I/O, or are played back through the digital interface DIGITAL I/O.

The portable voice module can also be used to record and play back data. This is especially applicable for recording measurement data. The measurement data are directly transferred to the portable voice module and recorded, and can be played back and evaluated elsewhere, for example.

The portable voice module has special application for a data processing device or a telecommunications terminal. For example, measurement data can be transferred to the portable voice module by data processing devices. In addition, the evaluation of measurement data can also take place in the data processing device. In telecommunications terminals, the portable voice module can provide for voice-controlled operation of the terminal.

Various particularly advantageous configurations of the telephone installation are possible with the use of a portable unit.

BRIEF DESCRIPTION OF THE DRAWINGS

A configuration example of the invention is explained by means of the figures, where.

BEST MODE FOR CARRYING OUT THE INVENTION

Figure 1:
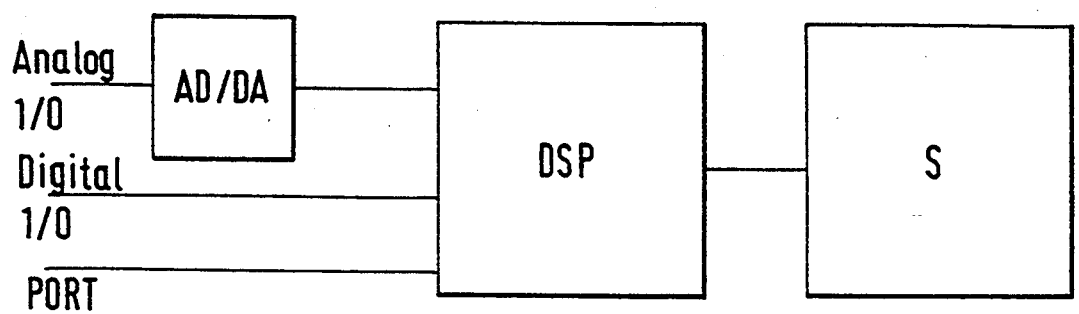
FIG. 1 is a block circuit diagram of the portable voice module.

In the following, the portable voice module will be explained by means of FIG. 1.

The portable voice module consists of a digital signal processor DSP, which is connected to a memory S. The digital signal processor (DSP) is also connected to a digital interface (DIGITAL I/O), and via an analog-digital/digital-analog converter (AD/DA) to an analog interface (ANALOG I/O). The digital signal processor is also connected to a computer interface (PORT). Voice input and output, thus audio input and output, are possible through the analog interface (ANALOG I/O). In the case of voice input, an analog signal is converted into a digital signal by the analog-digital/digital-analog converter (AD/DA), and is then supplied to the digital signal processor (DSP). In the case of voice output, the digital signal processor (DSP) supplies a digital signal to the analog-digital/digital-analog converter (AD/DA), where it is converted into an analog signal—an audio signal—and supplied to the analog interface (ANALOG I/O).

The digital interface (DIGITAL I/O) serves to input and output digital signals. The output is used to read digital signals or data from the voice module, and the input is used to record digital signals or data from the voice module. The digital data can be voice data, for example. In addition, graphic data can also be recorded and played back.

The digital interface (DIGITAL I/O) can also be used to control devices.

The computer interface (PORT) serves to control devices. In addition, it is possible to input and output data through the computer interface (PORT). In particular, measurement data or values are recorded and played back for evaluation.

Software programs for voice recognition, voice encoding and voice synthesizing are stored in the memory (S). The software programs for voice encoding and voice recognition are activated e.g. by inserting the voice module into a device containing an interface.

The memory (S) also stores graphic data and measurement data, which can be played back at any time.

The software programs for voice recognition serve to operate and control the devices, as will be explained later by means of the configuration example in FIG. 2.

The software programs for voice encoding serve to record and play back speech. The language is coded before it is stored in the memory (S), and the coded language, which is stored in the form of voice data, is retranslated into uncoded language.

The software programs for voice synthesizing serve to guide the user. The coded language, which is stored in the memory, is converted into uncoded language by the voice synthesizer. The uncoded language is output by the analog interface ANALOG I/O and serves to instruct the user of the portable voice module.

In the following, a configuration example will be explained by means of FIG. 2.

Figure 2:
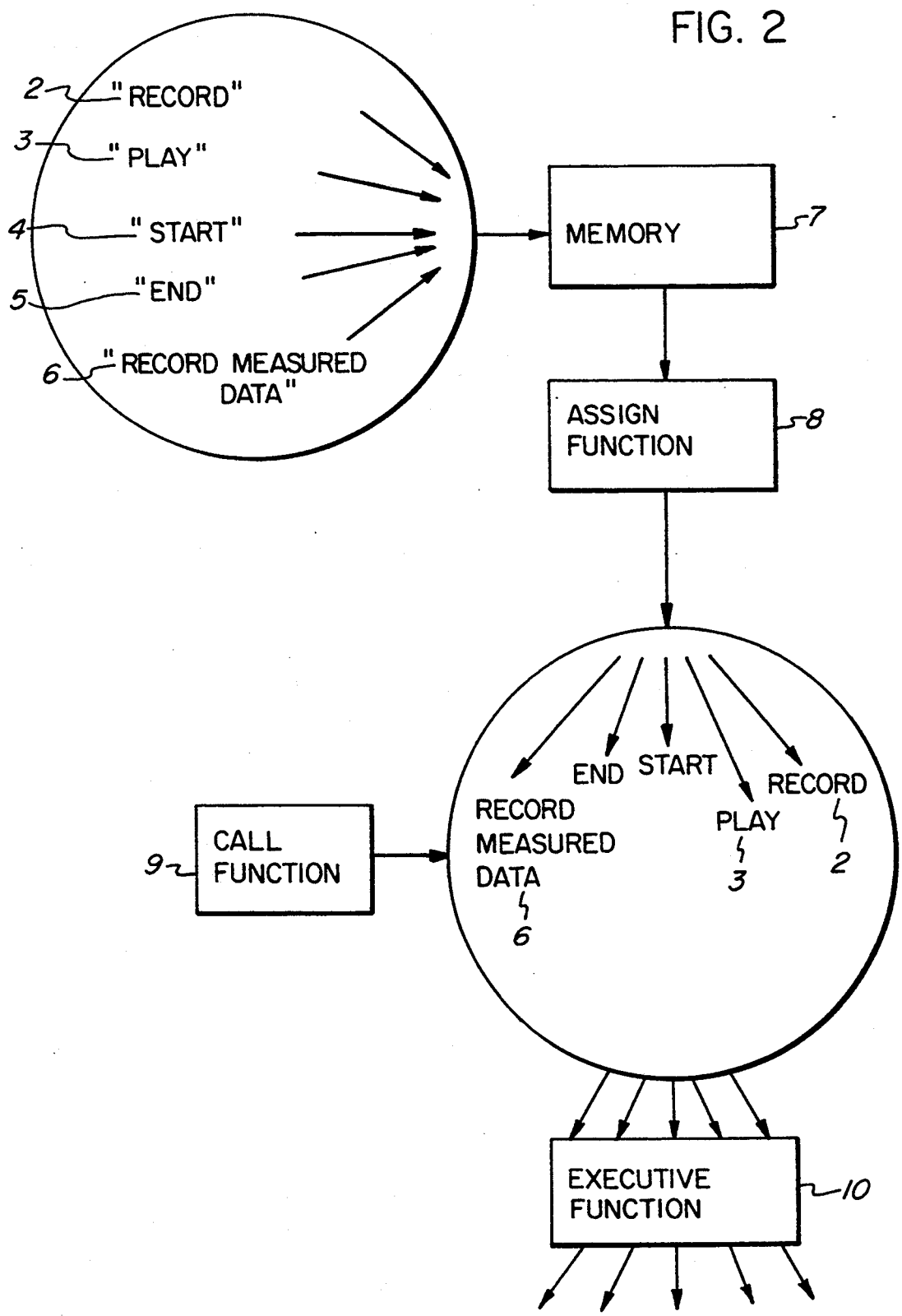
FIG. 2 is a flow diagram of an application example.

FIG. 2:
1. Active vocabulary
2. "Record"
3. "Play back"
4. "Start"
5. "End"
6. "Record measured values"
7. Store
8. Assign function
9. Call up function
10. Perform function For example, in a portable voice module, the words "Record", "Play back", "Start", "Record measurement value" and "End" are stored in the user's mother tongue. The stored words represent the executable control and operation commands, in other words the "active vocabulary" of the portable voice module.

The individual words are assigned a corresponding function. In this way, for example, the word "Record" is assigned the function of recording spoken language through the analog interface (ANALOG I/O), converting it into coded language and storing it in memory (S) as coded language in the form of voice data.

A corresponding function applies to the word "Play back", but in the opposite direction.

The word "Start" of the active vocabulary is assigned the function of starting any device. The device to be started is connected to the digital interface (DIGITAL I/O). The same applies to a function in the opposite direction triggered by the word "End".

The word "Record measurement value" triggers the function of recording measurement values by a device that is connected to the computer interface (PORT). The computer interface supplies the measurement values to the portable voice module, where they are stored in memory (S).

By carrying the portable voice module, the user brings along the "active vocabulary" and thereby the executable functions.

The user of the portable voice module can plug it into a device anywhere. In the present instance, the device is the measuring set of a medical diagnosis apparatus, e.g. the measuring set of a nuclear spin tomograph.

The acoustic command "Record measurement values" stores the measurement values, which are supplied by the nuclear spin tomograph via the computer interface (PORT) to the portable voice module. The portable voice module can be removed from the device after storage of the measurement values has been completed.

An evaluation of the measured values can take place elsewhere. In this way the user can connect the portable voice module to a data processor in his office. There he can retrieve the measured values for evaluation. The evaluation can be made by calculations or by matching with comparison values stored in the data banks.

The user of the portable voice module can also use it in a device with acoustic input, e.g. a telecommunications terminal or a telephone installation.

The acoustic command "Record" records the language that follows. In this way the user, e.g. a physician at a patient's bedside, can obtain and record diagnosis data or results during the examination, without outside help and without having to remove his hands from the patient.

Here too, an evaluation can take place at a different time or in a different place. The acoustic command "Play back" causes the portable voice module to repeat the previously recorded and stored language.

The control of devices—in this instance medical diagnosis devices—can also take place by means of the portable voice module. Thus, after connection to the device to be controlled, the acoustic command "Start" or "End" can cause the device to start a procedure, e.g. the production of x-rays for taking an x-ray picture, or to end the production of x-rays.

The 'active vocabulary' can be expanded to any size. Words can also be deleted from the active vocabulary, or replaced by other words.

Figure 3:
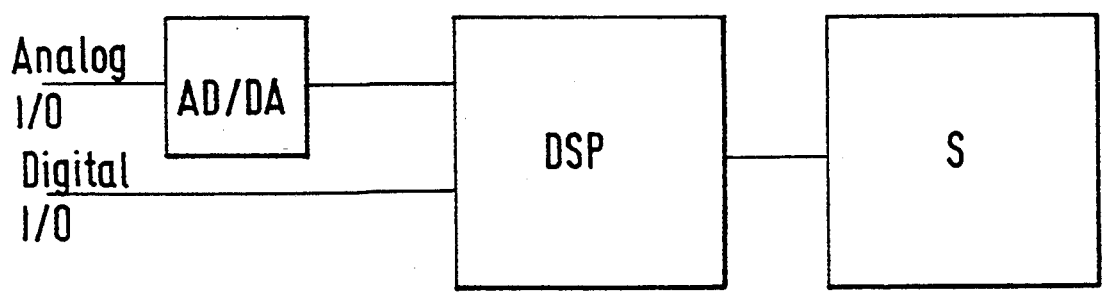
FIG. 3 is a block circuit diagram of the voice module of the telephone installation.

The telephone installation according to the invention can also consist of a portable voice module, as shown in FIG. 3, and of a telephone device with an interface for plugging in the portable voice module (not illustrated). The voice module is used for the voice-controlled operation of the telephone installation.

This portable voice module also consists of a digital signal processor (DSP), which is connected to a memory (S). The digital signal processor (DSP) is also connected to a digital interface (DIGITAL I/O), and to an analog interface (ANALOG I/O) via an analog-digital/digital-analog converter (AD/DA).

The memory (S) stores software programs for voice encoding, for voice recognition and software programs for service features. The software programs for voice encoding and voice recognition are activated by plugging the voice module into the telephone device. The software programs for service features can be called up by voice at any time. New software programs can be recorded and stored in the remaining free space of memory (S).

For example, the stored software programs can be software programs for voice encoding to instruct users, for voice recording, for notebook functions and to play back recorded language for call answering functions, for intercom uses and for other voice-controlled operating functions. The voice recognition can be speaker-dependent or speaker-independent. Voice encoding for user instruction includes voice-controlled help when using the telephone installation. The spoken language provides help to a user during the use of a telephone installation. For example, a voice informs the user which command to enter to obtain the desired function.

Voice storage for notebook functions records and stores the spoken language of a user, and can be retrieved from memory (S) at any time. This permits a user to record spoken language, and take it along for expansion at any time, or for evaluation.

When recorded language is played back as a call answering function, text recorded in the voice module is retrieved and played back. Thus, a user carries the text with him everywhere, and text from a caller can be stored, possibly by means of additionally stored language.

The intercom software is also stored in the portable voice module. This makes software standardization possible, regardless of the type of telephone device being used, i.e. regardless of whether it is an analog or a digital telephone device.

In that event, a voice input and output, thus an audio input and output, is also possible through the analog interface (ANALOG I/O). In the case of voice input, an analog signal is converted into a digital signal by the analog-digital/digital-analog converter (AD/DA), and supplied to the digital signal processor (DSP). In the case of voice output, a digital signal is supplied by the digital signal processor (DSP) to the analog-digital/digital-analog converter (AD/DA), where it is converted into an analog signal—an audio signal—and supplied to the analog interface (ANALOG I/O).

Digital signals can be input and output via the digital interface (DIGITAL I/O). The output serves to read digital signals or voice module dam, and the input for entering digital signals or voice module dam. The digital data can be voice data, for example. It is also possible to input and output graphic data through the digital interface.

In addition to the portable voice module, the telephone installation according to the invention consists of a telephone device (not illustrated). The telephone device in turn consists of the basic components of a basic telephone set. These basic components comprise a dial, a loudspeaker and a microphone, for example. A line interface and an interface for plugging in the portable voice module must also be present. The interface for the portable voice module serves to receive and connect the portable voice module to the telephone device and in the event no voice module is plugged in, a basic operating function remains, namely the telephone function to call an emergency number, for example. This is necessary to ensure that any potential user can telephone at any time, regardless of whether or not a voice module is plugged in.

The line interface can be designed for the connection of a digital telephone device, or for the connection of an analog telephone device.

The cooperation of the two telephone installation units, voice module and telephone device, can be described as follows:

Software programs for service features are programmed into the memory (S) of a portable voice module. The number of service features and the type of service features in the voice module can be selected as desired and is only limited by the size of the memory (S). Furthermore, a new software program for a new or an improved service feature can be recorded and stored in the memory (S) at any time.

In this way, the user of a portable voice module carries the desired service features with him in the configuration of a credit card, and is in a position to use these service features independently of the time and place where he is presently located.

The only requirement of the telephone device being used is to contain the basic components with which the plugged-in portable voice module can convert a basic telephone into a telephone device with all the desired service features. The telephone device can be any public or private telephone, or a mobile telephone, but also a data processor with telephone function, in other words a data processor which is also capable of telephone operation.

The result is the possibility of utilizing any type of telephone device by means of the portable voice module. In addition to the fact that the desired service features or functions are available anywhere and at any time, any desired telephone device becomes convertible.

The use of a portable voice module is explained by means of the following example.

A telephone subscriber owns a portable voice module. The software programs for the service features the subscriber desires are individually stored in the voice module. Furthermore, telephone devices composed of basic units are found in every possible place where the subscriber is located. This enables the subscriber to operate a telephone device by means of voice control, anywhere.

In the event the subscriber finds himself in a country of a different language for example, with the portable voice module he is still in a position to perform voice-controlled operation of a telephone device in his mother tongue, because the spoken operating instructions are entered into the voice module, which recognizes the language and converts the recognized commands into function instructions.

Furthermore, in the event the subscriber is driving a passenger vehicle e.g., and his voice module is plugged into the car's mobile telephone, he can still operate the telephone by voice control without the need to remove his hands from the steering wheel. For example, the operating instruction "dial Jane Doe", voiced by the subscriber, is recognized by the portable voice module as an operating instruction, and is converted into the function of dialing Jane Doe's telephone number.

This portable voice module can also be configured in the form of a credit card.

The telephone device can be a data processing unit with telephone function. The portable voice module is plugged into the data processing unit in the form of a credit card, for example, the data processing unit establishes a telephone connection and enables the telephone operation.

We claim:

1. A telephone installation comprising:
    a portable voice module for the voice-controlled operation and control of devices, comprising:
        an analog/digital and digital/analog converter circuit (AD/DA), responsive to analog user voice and active vocabulary command input signals from an analog interface (Analog I/O), for providing digital user voice and active vocabulary command input signals, and further responsive to digital voice output signals, for providing analog voice output signals to the analog interface (Analog I/O);
        a digital signal processor (DSP), responsive to digital input signals from a digital I/O interface (Digital I/O), responsive to computer interface input signals from a computer interface (PORT), and responsive to the digital user voice and active vocabulary command input signals, for providing digital data, computer interface data, or active vocabulary command and synthesized voice memory input signals, and further responsive to digital data, computer interface data, or synthesized voice memory output signals, for providing digital output signals to the digital I/O interface (Digital I/O), computer interface output signals to the computer interface (PORT), or digital voice output signals to the analog/digital and digital/analog converter circuit (AD/DA); and
        a memory circuit (S), responsive to the digital data, computer interface data, or active vocabulary command and synthesized voice memory input signals, for providing the digital data, computer interface data, or synthesized voice memory output signals to the digital signal processor (DSP); and
    a telephone device having a plug-in interface for receiving the portable voice module.

2. A telephone installation according to claim 1, in which spoken language is stored in the portable voice module.

3. A telephone installation according to claim 1, in which software programs are stored in the memory circuit (S) suitable for playing back speech, or to perform a hands-free telephone function.

4. A telephone installation according to claim 1, in which software programs are stored in the memory circuit (S) suitable for encoding voice for user guidance.

5. A telephone installation according to claim 1, in which the telephone device is a public telephone.

6. A telephone installation according to claim 1, in which the telephone device is a private telephone.

7. A telephone installation according to claim 1, in which the telephone device is a mobile telephone.

8. A telephone installation according to claim 1, in which the telephone device is a data processing device with a telephone operating function.

9. A portable voice module for the voice-controlled operation and control of devices, comprising:
    an analog/digital and digital/analog converter circuit (AD/DA), responsive to analog user voice and active vocabulary command input signals from an analog interface (Analog I/O), for providing digital user voice and active vocabulary command input signals, and further responsive to digital voice output signals, for providing analog voice output signals to the analog interface (Analog I/O);
    a digital signal processor (DSP), responsive to digital input signals from a digital I/O interface (Digital I/O), responsive to computer interface input signals from a computer interface (PORT), and responsive to the digital user voice and active vocabulary command input signals, for providing digital data, computer interface data, or active vocabulary command and synthesized voice memory input signals, and further responsive to digital data, computer interface data, or synthesized voice memory output signals, for providing digital output signals to the digital I/O interface (Digital I/O), computer interface output signals to the computer interface (PORT), or digital voice output signals to the analog/digital and digital/analog converter circuit (AD/DA); and
    a memory circuit (S), responsive to the digital data, computer interface data, or active vocabulary command and synthesized voice memory input signals, for providing the digital data, computer interface data, or synthesized voice memory output signals to the digital signal processor (DSP).

10. A portable voice module according to claim 9, wherein the analog user voice and active vocabulary command input signals include active vocabulary commands such as a record command for recording language spoken in the memory circuit (S), a playback command for playing back the language recorded from the memory circuit (S), a start command for providing a start command signal to any device connected to the digital interface (DIGITAL I/O), an end command for providing an end command signal to the device connected to the digital interface (DIGITAL I/O), and a record measurement command for recording measurement value from the device connected to the digital interface (DIGITAL I/O).

11. A portable voice module according to claim 9, wherein the digital input signals from the digital I/O interface (Digital I/O) include voice or graphics digital input signals, and the digital output signals to the digital I/O interface (Digital I/O) include voice, graphics or external device command digital output signals.

12. A portable voice module according to claim 9, wherein the computer interface input signals from the computer interface (PORT) include measurement data or external device command input signals, and the computer interface output signals to the computer interface (PORT) include measurement data or external device command output signals.

13. A portable voice module according to claim 9, wherein the memory (S) stores a software program for voice encoding, voice recognition and voice commands and their corresponding functions.

14. A portable voice module according to claim 10, wherein the active vocabulary commands can be expanded to any size, and words can be added or deleted from a list of the active vocabulary commands.

15. A portable voice module according to claim 10, wherein the memory (S) stores a software program for voice encoding to instruct users, for voice recording, for notebook functions and to playback recorded language for call answering functions, for intercom uses.

16. A portable voice module according to claim 15, wherein the software program is speaker-dependent or speaker-independent.

17. Portable voice module according to claim 9, in which the portable voice module is designed in the form of a credit card.

18. A portable voice module according to claim 9, wherein the portable voice module can record and play back voice or picture data.

19. A portable voice module according to claim 9, wherein the portable voice module can record and play back data, particularly measurement data, through the computer interface PORT.

20. A the portable voice module according to claim 9, wherein the portable voice module provides the voice-controlled operation or control of a data processing device or a telecommunications terminal.

* * * * *